(12) United States Patent
Jones, Jr. et al.

(10) Patent No.: US 6,565,101 B2
(45) Date of Patent: May 20, 2003

(54) HAULING TARPAULIN FOR SINGLE-HANDED OPERATION

(75) Inventors: Bruce Edward Jones, Jr., Hampstead, MD (US); Robert J. Rayer, III, Ann Arbor, MI (US); Margaret M Rayer, Ann Arbor, MI (US)

(73) Assignee: Custom Engineering LLC, Hampstead, MD (US)

( * ) Notice: Subject to any disclaimer, the term of this patent is extended or adjusted under 35 U.S.C. 154(b) by 0 days.

(21) Appl. No.: 09/888,985

(22) Filed: Jun. 25, 2001

(65) Prior Publication Data
US 2002/0195781 A1 Dec. 26, 2002

(51) Int. Cl.[7] .............................................. B62B 15/00
(52) U.S. Cl. ...................................................... 280/19
(58) Field of Search ............................... 280/19, 18, 20, 280/28.17; 150/166, 154; 141/390

(56) References Cited

U.S. PATENT DOCUMENTS

| | | |
|---|---|---|
| 2,974,971 A | 3/1961 | Buck |
| 3,355,187 A | 11/1967 | Brindle |
| 4,046,393 A | 9/1977 | Vadnais |
| 4,173,351 A * | 11/1979 | Hetland .................... 280/19 |
| 4,283,068 A * | 8/1981 | Keyser ..................... 280/19 |
| 4,693,504 A * | 9/1987 | Baker ....................... 294/1.1 |
| 5,104,133 A | 4/1992 | Reiner |
| 5,147,102 A * | 9/1992 | Dyer, Jr. ................... 294/152 |
| 5,529,321 A | 6/1996 | Thompson |
| 5,660,402 A | 8/1997 | Jones et al. |
| 5,943,831 A | 8/1999 | Pangburn |

* cited by examiner

Primary Examiner—Daniel G. DePumpo
(74) Attorney, Agent, or Firm—William S. Ramsey

(57) ABSTRACT

This hauling tarpaulin can be deployed, loaded with refuse, moved and unloaded by a single person. A stored tarpaulin rolled about a mandrel is easily unrolled and filled with lawn refuse. The mandrel holds the tarpaulin flat on the ground despite wind. When the hauling tarpaulin is filled with refuse, the hauling line is pulled, causing the mandrel to rise up on its legs, and the sides to rise, forming a boat-shaped structure which engulfs the refuse. The hauling tarpaulin then is pulled by the hauling line to the refuse collecting point. At the collecting point the tarpaulin is restored to its flat form and the waste material unloaded.

9 Claims, 3 Drawing Sheets

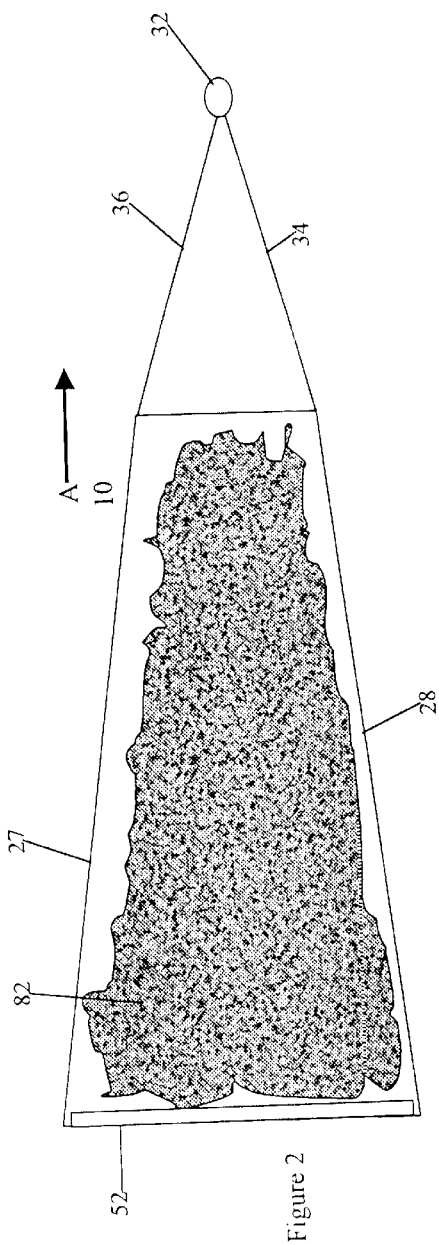
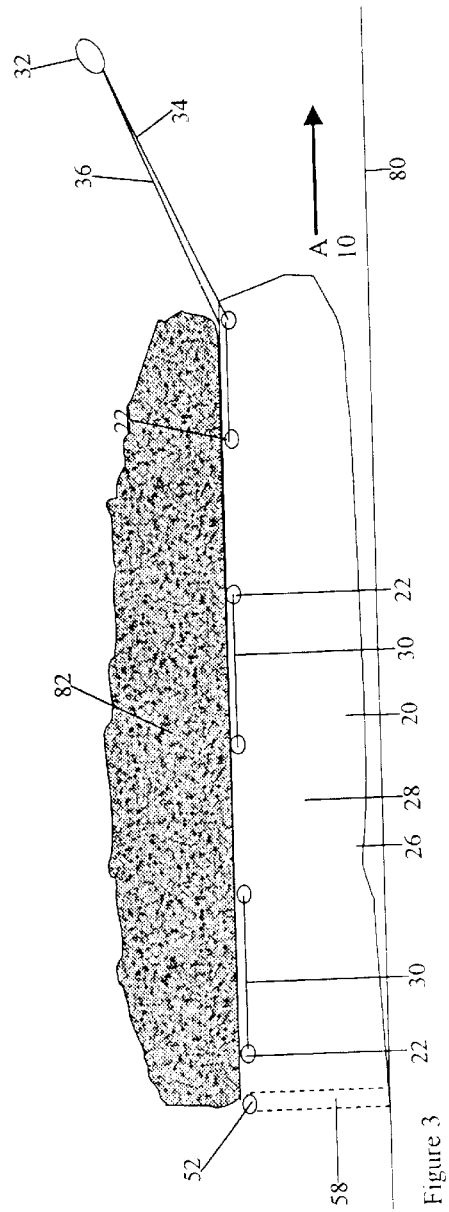
Figure 2
Figure 3

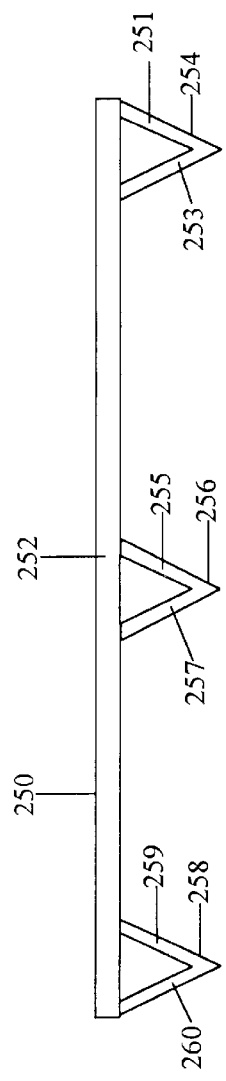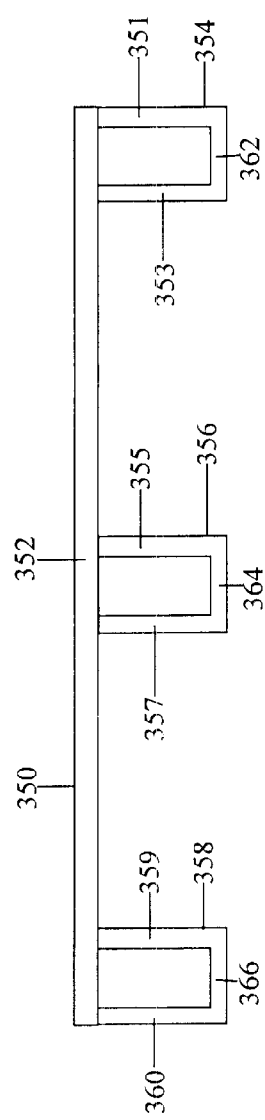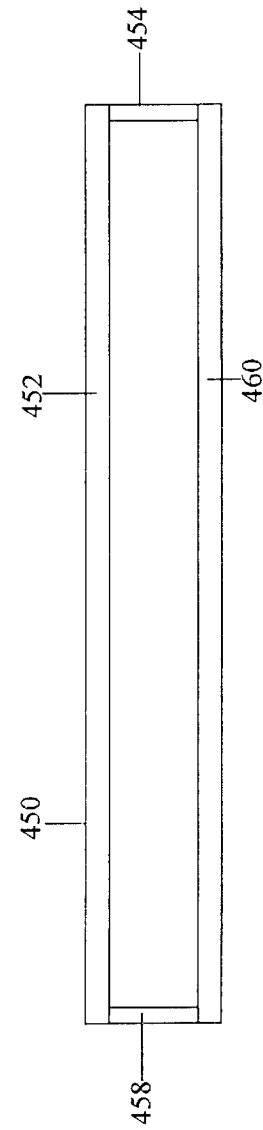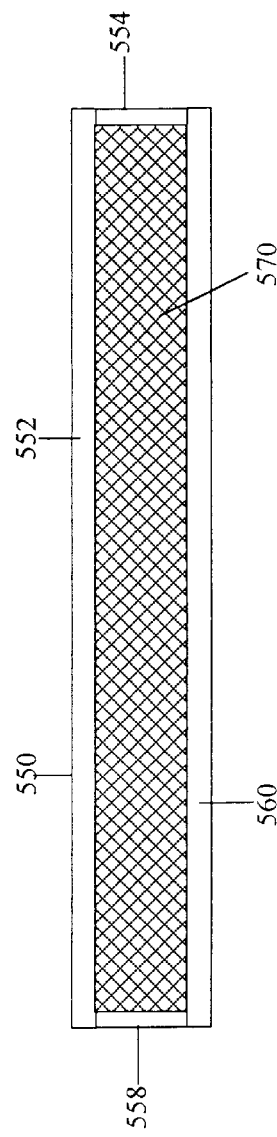
Figure 4
Figure 5
Figure 6
Figure 7

HAULING TARPAULIN FOR SINGLE-HANDED OPERATION

FEDERALLY SPONSORED RESEARCH

Not Applicable.

SEQUENCE LISTING OR PROGRAM

Not Applicable.

BACKGROUND

1. Field of Invention

This invention relates to loading and transporting of gardening and landscape refuse and other bulky items using a hauling tarpaulin.

2. Prior Art

Tarpaulins have long been used for collecting and hauling lawn refuse and litter. Problems emerge in using a simple tarpaulin for lawn refuse. Deployment of a tarpaulin on the ground requires the user to walk about the periphery unfolding the material. The edges of tarpaulins spread on the yard often are lifted by the wind, making it difficult to rake or load refuse onto the tarpaulin. Finally, raking refuse over the edge of a hauling tarpaulin may cause the edges to fold up, making it difficult to fill the tarpaulin.

This application discloses an improved hauling tarpaulin which allows single-handed unrolling, filling, moving, and unloading the hauling tarpaulin. This invention comprises a tarpaulin with a hauling rope deposed in grommets around the rear and sides, and a mandrel with legs attached which is fastened to the rear edge of the hauling tarpaulin.

The present invention therefore makes it possible for a single person to deploy, load, and drag a hauling tarpaulin to the refuse collection area, unload the trash, and roll-up the hauling tarpaulin.

U.S. Pat. No. 2,974,971 discloses a pick-up device for hauling leaves which is a canvas or plastic mat with straps in loops about the periphery. The device is anchored by pins to the ground while being loaded. A bar-like pull handle is attached at the front of the device.

U.S. Pat. No. 3,355,187 discloses a leaf handling device of flexible material with two battens in sleeves at the back end of the device. When the device is filled with leaves, the battens are brought up and attached together, creating a boat shaped device for convenient handling of the leaves.

U.S. Pat. No. 4,046,393 discloses a sled with a bar at the front and a handle attached by lines to the bar. The sled is rolled up around the bar and the handle is used to carry the rolled-up sled.

U.S. Pat. No. 5,104,133 discloses a hauling device for leaves which is a tarp with lines arranged about the edges so that a pull on the loop at the front of the device causes the back to rise up closing the back of the tarp and retaining the leaves. A flexible stiffening support material is inserted in a sleeve at the back of the tarp.

U.S. Pat. No. 5,529,321 discloses a tow bar assembly to which a tarp is attached for towing. The tow bar serves to anchor the tarp for filling and is the core around which the tarpaulin is rolled for storage and transport.

U.S. Pat. No. 5,660,402 discloses a lawn tarp with telescoping support bars inserted into hemmed pockets around the four sides of the tarp. Eyelets located about the four sides can be used to pull the tarp.

U.S. Pat. No. 5,943,831 discloses a tarp for collecting leaves with holes in the four corners and a lifting handle which engages the holes when the tarp corners are folded toward the center of the tarp.

None of the prior art inventions disclose hauling tarpaulins with the characteristics and advantages of the present invention, that is, a hauling tarpaulin which can be deployed, filled, and moved by a single person, and which is easily rolled up for storage.

OBJECTS AND ADVANTAGES

The objective of this invention is to provide a hauling tarpaulin which can be deployed by a single person.

Another objective of this invention is to provide a hauling tarpaulin stabilized against winds when open and spread out on the ground.

Another objective of this invention is to provide a hauling tarpaulin which forms a boat-shaped structure when the hauling line is pulled.

Another objective of this invention is to provide a hauling tarpaulin which is stored by rolling about a mandrel.

Another objective of this invention is to provide a hauling tarpaulin with a hauling line attached to the tarpaulin by grommets around three sides of the tarpaulin.

Another objective of this invention is to provide a hauling tarpaulin easily rolled up about a mandrel attached to the back end of the hauling tarpaulin.

SUMMARY

This application discloses a rectangular hauling tarpaulin comprising, a towing line attached by grommets about three sides of the tarpaulin, a mandrel comprising a rigid longitudinal bar the mandrel attached to the rear side of the tarpaulin with the longitudinal bar approximately parallel to the rear edge of the hauling tarpaulin.

This application further discloses a rectangular hauling tarpaulin comprising a towing line attached by grommets about three sides of the tarpaulin, a mandrel comprising a longitudinal bar and two or more legs attached approximately perpendicular to the longitudinal bar, and the mandrel attached to the rear side of the tarpaulin with the longitudinal bar approximately parallel to the rear edge of the hauling tarpaulin.

DRAWINGS

Figures

FIG. 2 shows a plan view of the hauling tarpaulin loaded with lawn refuse.

FIG. 3 shows a side view of the hauling tarpaulin loaded with lawn refuse.

FIG. 4 is a side view of a second embodiment mandrel.

FIG. 5 is a side view of a third embodiment mandrel.

FIG. 6 is a side view of a fourth embodiment mandrel.

FIG. 7 is a side view of a fifth embodiment mandrel.

REFERENCE NUMERALS

DETAILED DESCRIPTION

Figure 1:
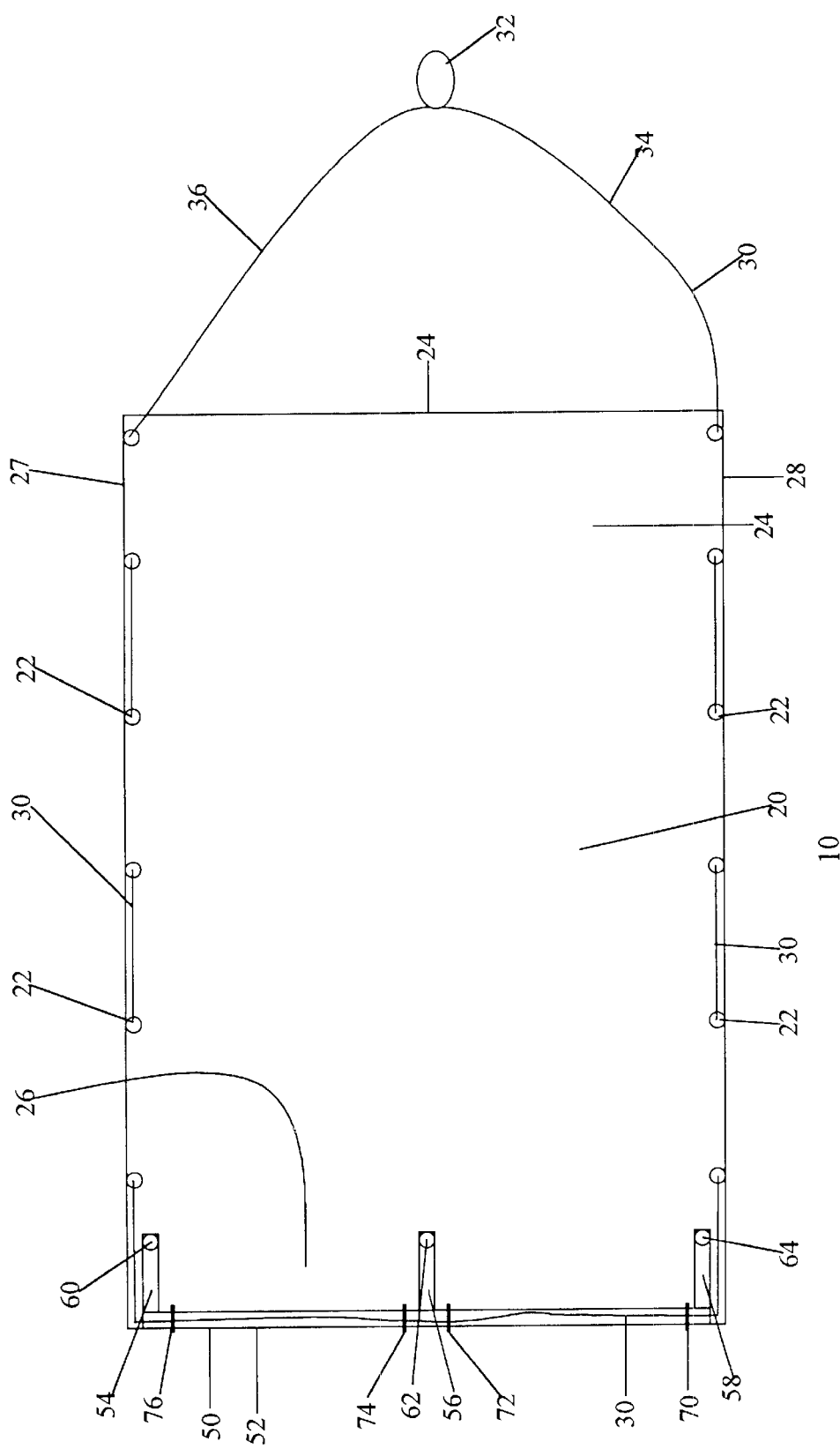
FIG. 1 shows a plan view of the hauling tarpaulin.

In this application, the term "grommet" means a flexible loop or solid hook that serves as a fastening, or an eyelet of firm material to strengthen or protect an opening, or any other means for attaching a flexible line to a tarpaulin which allows the line to be tightened as a purse-string, causing the tarpaulin to pucker. A preferred grommet is a brass eyelet.

The term "tarpaulin" means a flexible membrane, which may or may not be waterproof, and which is constructed of canvas, or other woven fabric, or of plastic material, and which is strong and abrasion-resistant enough to carry yard and lawn refuse. A preferred tarpaulin is made of canvas.

FIG. 1 is a plan view of the hauling tarpaulin 10. The top side 22 of the tarpaulin body 20 is shown. The tarpaulin body 20 is approximately rectangular with a relatively shorter front end 24 approximately equal in length to the rear end 26 and the relatively longer left side 27 approximately equal in length to the right side 28. Grommets 22 are arrayed about the left side 27 and right side 28.

A mandrel 50 is attached at the rear end 26. The mandrel 50 comprises a longitudinal bar 52 to which is attached a left leg 54, middle leg 56 and right leg 58. The left leg 54 is attached to the top 24 side of the tarpaulin body 20 by a rivet 60 or other fastener. The middle leg 56 is attached to the top 24 side of the tarpaulin body 20 by a rivet 62. The right leg 58 is attached to the top 24 side of the tarpaulin body 20 by a rivet 64. The longitudinal bar 52 is attached to the rear end 26 of the tarpaulin body 20 by straps 70, 72, 74 and 76 which extend through grommets in the rear end 26 of the tarpaulin body 20 (not visible in FIG. 1).

A line 30 extends through the grommets on the left side 27 and is attached by straps 70, 72, 74, and 76 to the top of the longitudinal bar 52 and extends through the grommets on the right side 28 of the tarpaulin body 20. Line 30 extends from the left side 27 forming a left pulling cord 36. Line 34 extends from the right side 28 forming a right pulling cord 36. Pulling cords 34 and 36 are fastened together forming a loop 32 for pulling the hauling tarpaulin.

FIGS. 2 and 3 are top and side views, respectively, of the hauling tarpaulin which has been loaded with lawn refuse.

FIG. 2 shows the lawn refuse 82 filling the hauling tarpaulin 10. Tension on the line 30 caused by pulling loop 32 in the direction of arrow A has caused the longitudinal bar 52 of the mandrel to rise up on the legs (not shown in FIG. 2). In addition, pulling the loop 32 has caused the left 27 and right 27 sides of the hauling tarpaulin to rise up. The effect of pulling the loop 32 has been to form a three sided enclosure surrounding the lawn refuse. The height of the enclosure is the length of the mandrel legs. Further tension on the pulling cords 34 and 36 and loop 32 drags the loaded hauling tarpaulin in the direction of arrow A.

FIG. 3 is a side view of the hauling tarpaulin filled 10 filled with lawn refuse 82. The bottom 26 of the right side 28 of the tarpaulin body 20 is visible. Grommets 22 are arrayed about the right side 28 of the tarpaulin body 20. The line 30 which passes through the grommets is shown. Also visible is the longitudinal bar 52 of the mandrel. The right leg 58 is obstructed by the right side 28 of the tarpaulin body 20 and is depicted in FIG. 3 by a dashed line.

FIG. 4 is a side view of a second embodiment mandrel 250. Attached to the longitudinal bar 252 is the left leg 254 comprised of left arm 251 and right arm 253; the middle leg 256 comprised of left arm 255 and right arm 257; and right leg 258 comprised of left arm 259 and right arm 260. The legs of the second embodiment mandrel are stronger than those of the first embodiment mandrel.

FIG. 5 is a side view of a third embodiment mandrel 350. Attached to the longitudinal bar 352 is the left leg 354 comprised of left arm 351 and right arm 353, the left and right arms attached to the connector bar 362; the middle leg 356 comprised of left arm 355 and right arm 357; the left and right arms attached to the connector bar 364; and right leg 358 comprised of left arm 359 and right arm 360, the left and right arms attached to the connector bar 366. The legs of the third embodiment mandrel allow a smoother and more convenient rolling of the hauling tarpaulin when it is stored.

FIG. 6 is a side view of a fourth embodiment mandrel 450. Attached to the longitudinal bar 452 is the left end 454 and right end 458. A second longitudinal bar 460 is attached to the other ends of the left end 454 and right end 458. The fourth embodiment mandrel is lighter and less expensive to manufacture than are the other embodiments.

FIG. 7 is a side view of a fifth embodiment mandrel 550. Attached to the longitudinal bar 552 is the left end 554 and right end 558. A second longitudinal bar 560 is attached to the other ends of the left end 554 and right end 558. A mesh fills the space within the fifth embodiment and provides additional strength for this embodiment. A polyethylene net is a preferred mesh.

The longitudinal bars and legs are made of any suitable lightweight, strong, resilient material. Suitable materials are polyvinyl chloride pipe, bamboo wood, or aluminum. A preferred longitudinal bar and legs are made of polyvinyl chloride piping.

Any flexible, strong, line or rope may be used with this invention. Suitable materials include sisial, hemp, cotton or plastic, such as nylon, or a metal cable or wire. A preferred line is made of nylon.

Operation

In use, the hauling tarpaulin is laid on the ground and unrolled with the mandrel toward the upwind side. Leaves and other lawn refuse is raked over the mandrel onto the tarpaulin. The mandrel firmly secures the rear end of the tarpaulin against winds and breezes which otherwise tend to cause the edges of a tarpaulin to fold over, and which must be restored to the original position.

Once the tarpaulin is full, the operator pulls on the hauling line at the front. This causes the sides of the tarpaulin to rise and the mandrel also rises and is supported on the legs. Thus a boat-shaped "bag" is formed with raised sides and rear. Waste material is engulfed on three sides and is thereby retained against being blown or falling off the tarpaulin.

The tarpaulin then is pulled over the ground to the desired collecting point. The waste material may be removed by lifting the mandrel, thereby dumping the material over the front of the tarpaulin. Alternatively, waste material is removed by loosening the line, thereby allowing the tarpaulin sides and the mandrel to fall to the ground. The waste material is removed by raking or shoveling. Finally, the hauling tarpaulin is cleaned by dumping by raising one side and shaking. The hauling tarpaulin is stored by rolling the tarpaulin over the mandrel. The mandrel serves to facilitate and speed the rolling-up of the tarpaulin.

The mandrel has three distinct functions. It serves as a core to facilitate the rolling of the tarpaulin for storage. It stabilizes the tarpaulin against the wind when the refuse is loaded. Finally, the mandrel forms the rear end of the loaded hauling tarpaulin and thereby establishes the height of the walls of the loaded hauling tarpaulin.

Conclusions, Ramifications, and Scope

The hauling tarpaulin of this invention makes it possible for a single user to deploy the tarpaulin, fill it with yard or garden waste, haul the loaded tarpaulin to a waste collection point, and unload the waste at the appropriate point. The mandrel makes it possible for a single user to quickly and easily roll up the hauling tarpaulin for storage when desired.

It will be apparent to those skilled in the art that the examples and embodiments described herein are by way of illustration and not of limitation, and that other examples may be used without departing from the spirit and scope of the present invention, as set forth in the appended claims.

We claim:

1. A rectangular hauling tarpaulin comprising,
 a towing line attached by grommets about three sides of the tarpaulin,
 a mandrel comprising a rigid longitudinal bar and two or more legs extending approximately perpendicular to the longitudinal bar, and
 the mandrel attached to the rear side of the tarpaulin with the longitudinal bar approximately parallel to the rear edge of the hauling tarpaulin.

2. The hauling tarpaulin of claim 1 wherein the mandrel has three legs.

3. A The hauling tarpaulin of claim 1 wherein the mandrel is made of polyvinyl chloride pipe.

4. The hauling tarpaulin of claim 1 wherein the legs are pipes attached to the longitudinal bar.

5. The hauling tarpaulin of claim 1 wherein the legs are V-shaped and each leg is attached to the longitudinal bar at two places.

6. The hauling tarpaulin of claim 1 wherein the legs are U-shaped and each leg is attached to the longitudinal bar at two places.

7. The hauling tarpaulin of claim 1 wherein mandrel further comprises a second longitudinal bar.

8. The hauling tarpaulin of claim 7 wherein the mandrel further comprises a mesh arrayed between the longitudinal bars and legs.

9. A rectangular hauling tarpaulin comprising,
 a towing line attached by grommets about three sides of the tarpaulin,
 a mandrel comprising a rigid longitudinal bar and one or more legs extending approximately perpendicular to the longitudinal bar, and
 the mandrel attached to the rear side of the tarpaulin with the longitudinal bar approximately parallel to the rear edge of the hauling tarpaulin.

\* \* \* \* \*